(12) United States Patent
Krishna et al.

(10) Patent No.: US 7,449,128 B2
(45) Date of Patent: *Nov. 11, 2008

(54) SCINTILLATOR NANOPARTICLES AND METHOD OF MAKING

(75) Inventors: Kalaga Murali Krishna, Bangalore (IN); Sergio Paulo Martins Loureiro, Saratoga Springs, NY (US); Mohan Manoharan, Niskayuna, NY (US); Geetha Karavoor, Kasaragod (IN)

(73) Assignee: General Electric Company, Niskayuna, NY (US)

( * ) Notice: Subject to any disclaimer, the term of this patent is extended or adjusted under 35 U.S.C. 154(b) by 780 days.

This patent is subject to a terminal disclaimer.

(21) Appl. No.: 10/872,867

(22) Filed: Jun. 21, 2004

(65) Prior Publication Data

US 2008/0246004 A1 Oct. 9, 2008

(51) Int. Cl.
*C09K 11/08* (2006.01)
(52) U.S. Cl. .................. 252/301.4 R; 252/301.4 F; 252/301.4 P; 252/301.6 R; 252/301.6 F; 252/301.6 P; 977/776; 977/811
(58) Field of Classification Search .......... 252/301.4 R, 252/301.4 F, 301.4 P, 301.6 R, 301.6 F, 301.6 P; 977/776, 811
See application file for complete search history.

(56) References Cited

U.S. PATENT DOCUMENTS

| 4,421,671 A | 12/1983 | Cusano et al. |
| 4,466,930 A | 8/1984 | Greskovich et al. |
| 4,473,513 A | 9/1984 | Cusano et al. |
| 4,518,546 A | 5/1985 | Greskovich et al. |
| 4,525,628 A | 6/1985 | DiBianca et al. |
| 4,571,312 A | 2/1986 | Greskovich et al. |
| 4,747,973 A | 5/1988 | Cusano et al. |
| 4,783,596 A | 11/1988 | Riedner et al. |
| 4,870,279 A | 9/1989 | Cueman et al. |
| 5,013,696 A | 5/1991 | Greskovich et al. |
| 5,057,692 A | 10/1991 | Greskovich et al. |
| 5,100,598 A | 3/1992 | Dole et al. |
| 5,116,559 A | 5/1992 | Dole et al. |

(Continued)

FOREIGN PATENT DOCUMENTS

WO WO 00/36050 * 6/2000

OTHER PUBLICATIONS

U.S. Appl. No. 10/815,900, filed Mar. 31, 2004, entitled Luminescent Nanomaterial Powders Having Predetermined Morphology and Method of Making.

*Primary Examiner*—C. Melissa Koslow
(74) *Attorney, Agent, or Firm*—Jason K. Klindtworth

(57) ABSTRACT

A nanomaterial comprising a plurality of nanoparticles. The plurality of nanoparticles includes at least one dopant and at least one of a metal oxide, a metal phosphate, a metal silicate, a metal hafnate, a metal aluminate, and combinations thereof. The metal is one of an alkali earth metal, a lanthanide, and a transition metal. The plurality of nanoparticles is formed by forming a homogenized precursor solution of at least one metal precursor and at least one dopant precursor, adding a fuel and optionally at least one of a phosphate source, a silicate source, a hafnate source, and an aluminate source to the precursor solution, removing water from the precursor solution to leave a reaction concentrate, and igniting the reaction concentrate to form a powder comprising the nanomaterial. In one embodiment, the nanomaterial is a scintillator material.

34 Claims, 2 Drawing Sheets

U.S. PATENT DOCUMENTS

| | | |
|---|---|---|
| 5,116,560 A | 5/1992 | Dole et al. |
| 5,318,722 A | 6/1994 | Tsoukala et al. |
| 5,360,557 A | 11/1994 | Tsoukala et al. |
| 5,391,876 A | 2/1995 | Tsoukala et al. |
| 5,413,736 A * | 5/1995 | Nishisu et al. ........ 252/301.4 R |
| 5,484,750 A | 1/1996 | Greskovich et al. |
| 5,521,387 A | 5/1996 | Riedner et al. |
| 5,882,547 A | 3/1999 | Lynch et al. |
| 6,036,886 A * | 3/2000 | Chhabra et al. ....... 252/301.4 R |
| 6,093,347 A | 7/2000 | Lynch et al. |
| 6,391,273 B1 * | 5/2002 | Konrad et al. ................ 423/263 |
| 6,706,212 B2 | 3/2004 | Venkataramani et al. |
| 6,979,415 B1 * | 12/2005 | Krishna et al. ........ 252/301.4 P |
| 2003/0111644 A1* | 6/2003 | Chen et al. ............ 252/301.4 R |
| 2003/0193040 A1 | 10/2003 | Venkataramani et al. |

* cited by examiner

US 7,449,128 B2

SCINTILLATOR NANOPARTICLES AND METHOD OF MAKING

BACKGROUND OF THE INVENTION

The invention relates to nanomaterials comprising a plurality of nanoparticles. More particularly, the invention relates to scintillator materials comprising a plurality of nanoparticles.

Nanomaterials are used in processing steps in the fabrication of scintillators for imaging applications and as phosphors for lighting applications. Known scintillator materials are thallium-doped sodium iodide (NaI:Tl), cesium fluoride (CsF), barium fluoride ($BaF_2$), and bismuth germanate ($Bi_4Ge_3O_{12}$ or "BGO"). NaI:Tl has a good stopping power, but a long decay constant of about 250 nsec (nanoseconds). CsF has relatively poor stopping power of about 0.43 $cm^{-1}$ and is highly hygroscopic. BGO has a relatively good stopping power but a relatively low light output and a long decay constant (of about 300 nsec). Although $BaF_2$ is not as hygroscopic as CsF, it has a poor stopping power similar to that of CsF and a much longer decay constant (of about 620 nsec).

Various synthesis routes, such as sol-gel, colloidal, precipitation, combustion synthesis, and solid-state methods have been used to produce nanomaterials. Combustion synthesis typically involves the choice of a nitrate precursor, the addition of a fuel to the nitrate precursor and ignition of the nitrate precursor-fuel mixture to provide an oxide based nanomaterial. However, available combustion synthesis methods have not been able to provide nanomaterials comprising a broad range of materials, such as phosphates, silicates, hafnates, and aluminates of alkali earth metals, lanthanides and transition metals. Therefore, what is needed is a nanomaterial comprising a plurality of nanoparticles wherein the plurality of nanoparticles comprises the abovementioned materials and is made by combustion synthesis. What is also needed is a method of making a scintillator nanomaterial comprising oxides, phosphates, silicates, hafnates, and aluminates of such metals.

SUMMARY OF THE INVENTION

The present invention meets these and other needs by providing a combustion based method of producing nanoparticles of oxides, phosphates, silicates, hafnates, and aluminates of alkali earth metals, lanthanides and transition earth metals. The invention also provides a material made by combustion synthesis.

Accordingly, one aspect of the invention is to provide a nanomaterial comprising a plurality of nanoparticles. The plurality of nanoparticles comprises at least one dopant and at least one of a metal oxide, a metal phosphate, a metal silicate, a metal hafnate, a metal aluminate, and combinations thereof. The metal is one of an alkali earth metal, a lanthanide, and a transition metal. The plurality of nanoparticles is formed by forming a homogenized precursor solution of at least one metal precursor and at least one dopant precursor, adding a fuel and optionally at least one of a phosphate source, a silicate source, a hafnate source, and an aluminate source to the precursor solution, removing water from the precursor solution to leave a reaction concentrate, and igniting the reaction concentrate to form a powder comprising the nanomaterial.

A second aspect of the invention is to provide a nanomaterial comprising a plurality of nanoparticles. The plurality of nanoparticles comprises at least one dopant and at least one of a metal oxide, a metal phosphate, a metal silicate, a metal hafnate, a metal aluminate, and combinations thereof. The metal is one of an alkali earth metal, a lanthanide, and a transition metal. The plurality of nanoparticles is formed by forming a homogenized precursor solution of at least one metal precursor and at least one dopant precursor, adding a fuel and optionally at least one of a phosphate source, a silicate source, a hafnate source, and an aluminate source to the precursor solution, removing water from the precursor solution to leave a reaction concentrate, and igniting the reaction concentrate to form a powder comprising the nanomaterial, and wherein the nanomaterial is a scintillator.

A third aspect of the invention is to provide a method of making a scintillator nanomaterial comprising a plurality of nanoparticles. The plurality of nanoparticles comprises at least one dopant and at least one of a metal oxide, a metal phosphate, a metal silicate, a metal hafnate, a metal aluminate, and combinations thereof, wherein the metal is one of an alkali earth metal, a lanthanide, and a transition metal. The method comprises: providing at least one metal precursor and at least one dopant precursor; forming a homogenized precursor solution of the at least one metal precursor and the at least one dopant precursor; adding a fuel and optionally at least one of a phosphate source, a silicate source, a hafnate source, and an aluminate source to the homogenized precursor solution; removing water from the homogenized precursor solution to leave a reaction concentrate; and igniting the reaction concentrate to form a powder comprising the plurality of nanoparticles.

These and other aspects, advantages, and salient features of the present invention will become apparent from the following detailed description, the accompanying drawings, and the appended claims.

DETAILED DESCRIPTION OF THE INVENTION

Figure 1:
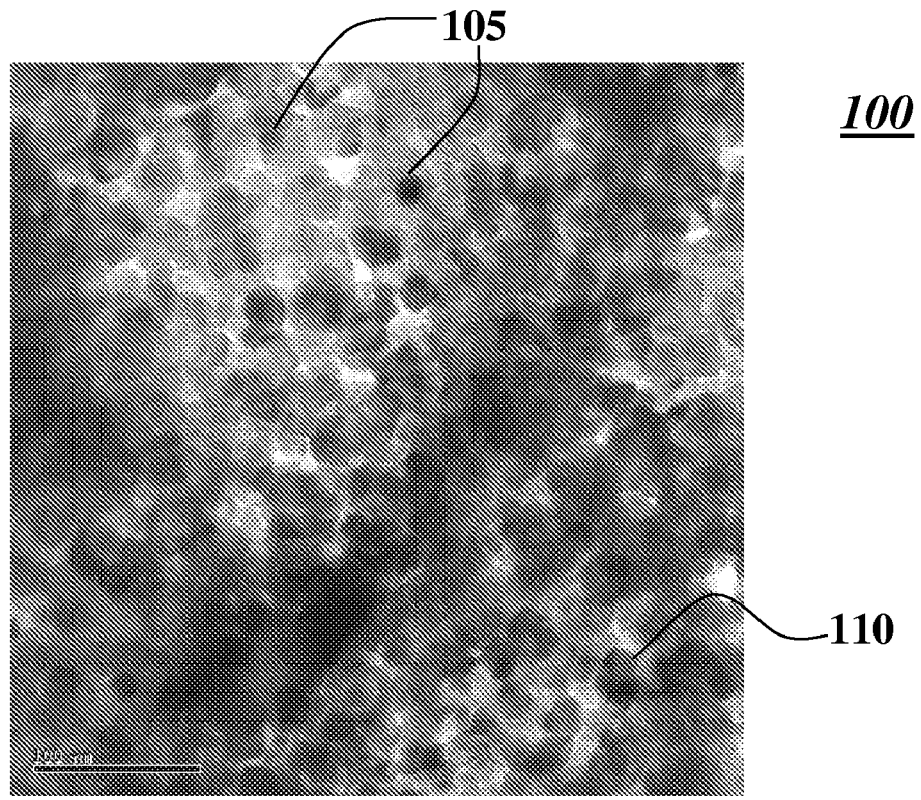
FIG. 1 is a transmission electron microscopy (TEM) image of strontium hafnate doped with cerium.

In the following description, like reference characters designate like or corresponding parts throughout the several views shown in the figures. It is also understood that terms such as "top," "bottom," "outward," "inward," and the like are words of convenience and are not to be construed as limiting terms.

Figure 2:
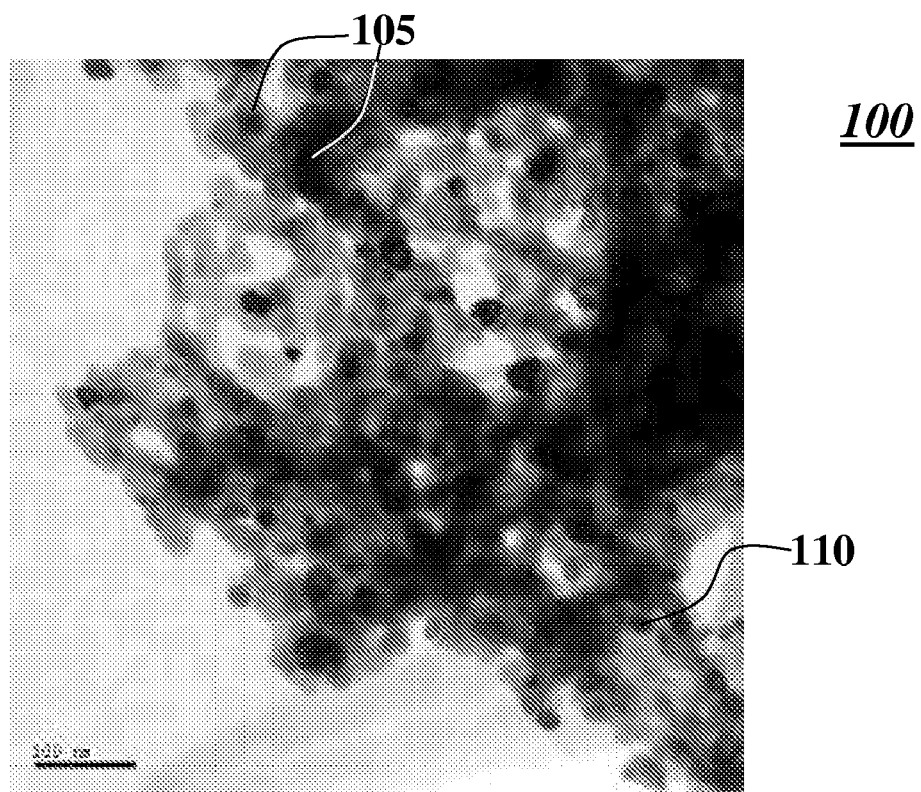
FIG. 2 is a transmission electron microscopy (TEM) image of yttrium gadolinium oxide doped with europium.

Referring to the drawings in general, it will be understood that the illustrations are for the purpose of describing different embodiments of the invention, and are not intended to limit the invention thereto. Turning to FIGS. 1 and 2, a nanomaterial of the present invention is shown. FIG. 1 is a transmission electron microscopy (TEM) image of strontium hafnate doped with cerium and FIG. 2 is a transmission electron microscopy (TEM) image of yttrium gadolinium oxide doped with europium. As presented in FIG. 1 and FIG. 2, nanomaterial 100 comprises a plurality of nanoparticles 105 having a spheroidal morphology 110. Typically, the plurality of nanoparticles 105 comprises at least one dopant and at least one of a metal oxide, a metal phosphate, a metal silicate, a metal hafnate, a metal aluminate, and combinations thereof. The metal is at least one of an alkali earth metal, a lanthanide, and a transition metal. The transition metal is at least one of vanadium, chromium, manganese, iron, cobalt, nickel, copper, zinc, zirconium, niobium, molybdenum, ruthenium, rhodium, rhenium, osmium, iridium, hafnium, tantalum, and combinations thereof. The lanthanide is typically, one of lanthanum, cerium, praseodymium, neodymium, samarium, europium, gadolinium, terbium, dysprosium, holmium, erbium, thulium, ytterbium, lutetium, yttrium, and combinations thereof. The alkali earth metal is at least one of one of calcium, strontium, barium, and combinations thereof. Each of the nanoparticles 105 may comprise any one of the aforementioned metals and compounds of the metals listed above or any combination of such compounds and metals. In one embodiment of the present invention, the plurality of nanoparticles are optically transparent to visible light. The plurality of nanoparticles 105 has at least one of the three dimensions in a range from about 10 nm to about 300 nm. In one embodiment, the plurality of nanoparticles 105 has at least one dimension in a range from about 10 nm to about 100 nm. In a preferred embodiment, the plurality of nanoparticles 105 has at least one dimension in a range from about 20 nm to about 60 nm. In one embodiment, the nanomaterial is a scintillator.

A scintillator is generally understood in the art to refer to a material that converts high-energy radiation, such as x-rays and gamma-rays, into visible light. Scintillators are materials of great utility and relevance in medical imaging, and non-destructive evaluation.

The performance and utility of a scintillator material to convert incident non-visible radiation into visible light depends on several factors such as the crystal chemistry of the host lattice composition, the type and proportion of activator, the interaction between the host lattice and the activator, and numerous processing factors such as synthesis temperatures, reaction times and rates, and the like. The processing of the nanomaterials into a final useful shape requires careful control over size, shape, and morphology of the scintillator nanomaterial compositions. Nanomaterials offer the advantage of controlling and tailoring properties at the microscopic level as well as potentially simplifying the processing of such materials for scintillator applications.

Positron emission tomography (hereinafter referred to as 'PET'), an exemplary medical imaging technique, employs a radioactively labeled substance administered to a patient that is subsequently traced within the patient's body by means of an instrument that detects the decay of the radioactive isotope. The emitted radiation penetrates the surrounding tissue, exits the patient's body, and is absorbed and recorded by an array of photodetectors. Biological activity within an organ under investigation can be assessed by tracing the source of the radiation emitted from the patient's body to the photodetectors.

The value of PET as a clinical imaging technique is in large measure dependent upon the performance of the photodetectors. Each photodetector comprises a scintillator cell or pixel coupled to photomultiplier tubes. When a photon strikes a scintillator cell, it excites the scintillator material to produce light that is sensed by the photomultiplier tubes. The scintillator material desirably has good stopping power, high light output, and fast decay time. The stopping power is the ability to stop photons in as little materials as possible, so as to reduce the overall size of the photodetector and, therefore, enhance the light collection efficiency and energy resolution. Stopping power is typically expressed as the linear attenuation coefficient r having units of inverse centimeters ($cm^{-1}$). After a photon beam has traveled a distance x in a scintillator material, the proportion of photons that has not been stopped by the scintillator material is $\exp(-\tau x)$. Thus, for a good scintillator material, $\tau$ should be as large as possible. High light output is important because the photodetectors will have higher sensitivity, and, thus, the dose of the radioactive material administered to the patient can be reduced. Decay time (also known as time constant, decay constant, or primary speed) is a measure of how fast the scintillator material stops emitting light after cessation of photon excitation. Short decay time allows for more rapid scanning, and, thus, better observation of the motion of the body's organs.

One aspect of the present invention is to provide a method 160 for making nanomaterial 100 comprising a plurality of nanoparticles 105. Nanomaterial 100 comprises at least one dopant and at least one of a metal oxide, a metal phosphate, a metal silicate, a metal hafnate, a metal aluminate, and combinations thereof, wherein the metal is one of an alkali earth metal, a lanthanide, and a transition metal. Each of the nanoparticles 105 may comprise any one of the aforementioned compounds of the metals listed above or any combination of such compounds and metals. The method comprises providing at least one metal precursor and at least one dopant precursor, forming a homogenized precursor solution of at least one metal precursor and at least one dopant precursor, adding a fuel and optionally at least one of a phosphate source, a silicate source, a hafnate source and an aluminate source to the homogenized precursor solution, removing water from the homogenized precursor solution to leave a reaction concentrate, and igniting the reaction concentrate to form a powder comprising the plurality of nanoparticles. The disclosed method 160 of making nanomaterial 100 is represented in FIG. 3 as a flow chart.

Figure 3:
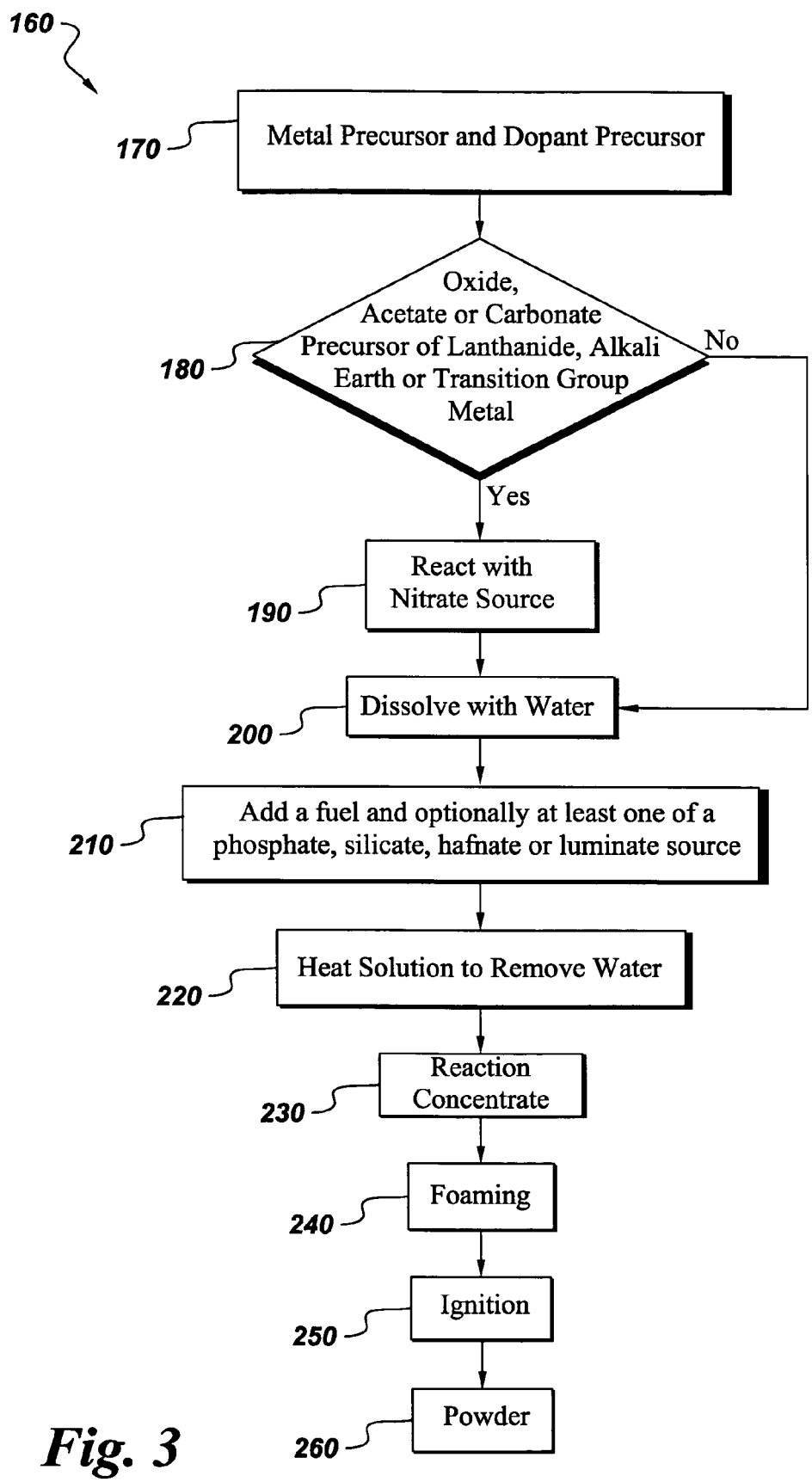
FIG. 3 is a flow chart illustrating the method for making a nanomaterial according to the present invention.

The method of the present invention 160 summarized in FIG. 3 begins with step 170, in which stoichiometric amounts of the at least one metal precursor and at least one dopant precursor are provided. The metal precursor comprises at least one of a metal nitrate, a metal oxide, a metal acetate, a metal carbonate, and combinations thereof. The metal is at least one of an alkali earth metal, a lanthanide, and a transition metal. The transition metal is at least one of vanadium, chromium, manganese, iron, cobalt, nickel, copper, zinc, zirconium, niobium, molybdenum, ruthenium, rhodium, rhenium, osmium, iridium, hafnium, tantalum, and combinations thereof. The lanthanide is one of lanthanum, cerium, praseodymium, neodymium, samarium, europium, gadolinium, terbium, dysprosium, holmium, erbium, thulium, ytterbium, lutetium, yttrium, and combinations thereof. The alkali earth metal is at least one of one of calcium, strontium, barium, and combinations thereof.

The dopant precursor is a compound of at least one of cerium, lutetium, europium, terbium, and combinations thereof and the dopant comprises at least one of an oxide, an acetate, a carbonate, a nitrate, and combinations thereof, of the abovementioned metals. The oxide, carbonate, and acetate precursors are hereinafter referred to as "non-nitrate precursors". Each of the nanoparticles 105 may comprise any one of the aforementioned compounds of the metals listed above or any combination of such compounds and metals.

Turning to FIG. 3, the chosen process depends on the chemical species that are used as precursors. For example, nitrate and non-nitrate precursors are separated in step 180 to allow further processing, depending on the precursor type.

Following separation, a non-nitrate precursor is converted to a nitrate precursor by reacting the precursor with a nitrate source, such as, but not limited to, nitric acid and ammonium nitrate as seen in step 190. A metal nitrate precursor is consequently obtained.

In step 200, the metal nitrate precursor is dissolved in water to form an aqueous solution, which is homogenized by stirring. The pH of the solution is maintained by controlling the ratio of water to nitric acid. In one embodiment, the pH of the homogenized precursor solution is maintained in a range from about 0.5 to about 5. In a preferred embodiment, the pH of the homogenized precursor solution is maintained in a range from about 1 to about 3.5.

In step 210, a fuel is added to the homogenized precursor solution to provide the means for ignition of the homogenized precursor solution. In one embodiment, the fuel is a carbon source. Non-limiting examples of the carbon source include glycine, urea, hydrazine, and combinations thereof. Typically, the ratio of fuel to metal nitrate varies in a range from about 1:2 to about 2:1. An optional addition of at least one of a phosphate source, a silicate source, a hafnate source and an aluminate source is done to form a metal salt. Non-limiting examples of the phosphate source include di-ammonium hydrogen phosphate, phosphoric acid, boron phosphate, and combinations thereof. Non-limiting examples of the silicate source include tetraethyl orthosilicate (TEOS), tetramethyl orthosilicate (TMOS), and combinations thereof. Non-limiting examples of the hafnate source include hafnium chloride, hafnium nitrate, hafnium carbonate, hafnium acetate, and combinations thereof. Non-limiting examples of the aluminate source include aluminum chloride, aluminum nitrate, aluminum carbonate, aluminum acetate, and combinations thereof. Depending on the pH, the homogenized precursor solution is either clear, translucent, or milky.

In step 220, water is removed from the homogeneous precursor solution formed in step 210. In one embodiment, the homogeneous precursor solution is heated by placing on a hot plate that is maintained at a temperature in a range from about 200° C. to about 500° C., or in any sub-range therebetween. In a preferred embodiment, the temperature of the hot plate is in a range from about 200° C. to about 300° C. Alternatively, the homogeneous precursor solution may be heated in a furnace or a microwave oven. Typically, the heating of the homogeneous precursor solution is followed by boiling, in step 230, to remove water, leaving behind a reaction concentrate comprising a slurry or paste containing the reaction product. In step 240, further heating the reaction concentrate leads to foaming of the reaction concentrate. Foaming of the reaction concentrate is accompanied by evolution of gases formed as a result of conversion of nitrates to metal phosphates, silicates, hafnates, or aluminates. In step 250, foaming is followed by ignition. In one embodiment, the foaming product ignites and flames to produce a voluminous, fluffy powder comprising the plurality of nanoparticles. In another embodiment, foaming is followed by smoldering of the reaction concentrate. No flame is observed in this case, although the foaming product turns red hot and smokes. Yellow smoke is observed when urea is used as a fuel, whereas black/brown smoke is observed when glycine is used as a fuel.

In step 260, a powder comprising nanomaterial 100 is obtained as a result of the exothermic reactions described above. It is typical for the process to progress from step 220 to step 260 in about 15 minutes.

After completion of the exothermic reaction, the powder comprising the plurality of nanoparticles is homogenized (not shown in FIG. 3). In one embodiment, homogenization of the powder is completed by at least one of grinding and milling the powder.

The size of the plurality of nanoparticles 105 obtained by method 160 depends on the flame temperature, which in turn is effected by the fuel-to-oxidizer ratio. The fuel-to-oxidizer ratio may be varied from about 2:1 to about 1:2. The metal nitrate precursors act as oxidizers in the process. In the case where an insufficient amount of oxidizer is present in the homogeneous precursor solution, oxidizers, such as, but not limited to, ammonium nitrate, are added to the solution.

In one embodiment, the powder comprising the plurality of nanoparticles is stabilized. Stabilization includes crystal growth and removing any residual carbon from the powder. Stabilization of the powder is achieved by heating the powder to a predetermined temperature in a controlled atmosphere for a period of time. In one embodiment, the predetermined temperature is in a range from about 600° C. to about 1200° C., or in any sub-range therebetween. In a preferred embodiment, the predetermined temperature is in a range from about 800° C. to about 1000° C. The period of heat treatment of the powder is in a range from about 1 hour to about 12 hours, or in any sub-range therebetween. In a preferred embodiment, the period of heat treatment of the powder is in a range from about 1 hour to about 6 hours. In one embodiment, the controlled atmosphere comprises at least one of air, nitrogen, hydrogen, and combinations thereof. The controlled atmosphere may comprise any one of the aforementioned gases or any combinations thereof.

In one embodiment of the present invention, the nanomaterial 100 is a scintillator. In another embodiment, the nanomaterial is at least one of strontium hafnate, yttrium gadolinium oxide, gadolinium aluminate, and combinations thereof.

Another aspect of the invention is to provide a nanomaterial comprising a plurality of nanoparticles. The plurality of nanoparticles comprises at least one dopant and at least one of a metal oxide, a metal phosphate, a metal silicate, a metal hafnate, a metal aluminate, and combinations thereof. The metal is one of an alkali earth metal, a lanthanide, and a transition metal. The plurality of nanoparticles is formed by forming a homogenized precursor solution of at least one metal precursor and at least one dopant precursor, adding a fuel and optionally at least one of a phosphate source, a silicate source, a hafnate source, and an aluminate source to the precursor solution, removing water from the precursor solution to leave a reaction concentrate, and igniting the reaction concentrate to form a powder comprising the nanomaterial wherein the nanomaterial is a scintillator.

The following example illustrates the features, and advantages of the invention, and is not intended to limit the invention in any way.

EXAMPLE 1

Strontium Hafnate Doped with Cerium

A 10 g batch of strontium hafnate doped with cerium, having 0.995 moles hafnium, 1.025 moles strontium, and 0.005 moles cerium, was prepared. A precursor solution was prepared by dissolving hafnium nitrate (13.38 g), strontium nitrate (6.83 g), and hexahydrate cerium nitrate (0.068 g), in 50 ml of water. The precursor solution was homogenized by stirring. The pH of the precursor solution was adjusted to 0.5 by addition of water and nitric acid. Final volume of the precursor solution was 100 ml. Glycine (7.97 g) was added to the solution. The solution was placed on a pre-heated hot plate and heated to a temperature of about 300° C. On heating, water was removed and a reaction concentrate was formed. Upon further heating, foaming of the reaction concentrate took place. With continuous heating, the foaming product was ignited and flamed to produce a voluminous and fluffy powder comprising the plurality of nanoparticles. The powder was ground to make it homogeneous. The homogenized powder was then placed in an alumina crucible and heated at 900° C. for 12 hours in a controlled atmosphere comprising 1% hydrogen diluted with nitrogen. The flow rate of the hydrogen/nitrogen mixture was maintained at about 0.5 liters/hour. Following the heat treatment, x-ray diffraction was carried out to determine the particle size of the powder. The mean particle size was 20 nm. A substantially spherical morphology 110 of the so formed powder was confirmed using TEM.

EXAMPLE 2

Yttrium Gadolinium Oxide Doped with Europium

A 10 g batch of yttrium gadolinium oxide doped with europium, having 1.34 moles yttrium, 0.6 moles gadolinium, and 0.06 moles europium, was prepared. A precursor solution was prepared by dissolving yttrium oxide (5.598 g), gadolinium oxide (4.024 g), and europium oxide (0.391 g), in a 40/60 ml mixture of nitric acid/water. The precursor solution was then homogenized by stirring. Final volume of the precursor solution was 100 ml. Glycine (11.11 g) was added to the solution. The solution was placed on a pre-heated hot plate and heated to a temperature of about 300° C. On heating, water was removed and a reaction concentrate was formed. Upon further heating, foaming of the reaction concentrate took place. With continuous heating, the foaming product was ignited and flamed to produce a voluminous and fluffy powder comprising the plurality of nanoparticles. The powder was then ground to make it homogeneous. The homogenized powder was then placed in an alumina crucible and heated at 900° C. for 6 hours in air. Following the heat treatment, x-ray diffraction was carried out to determine the particle size of the powder. The mean particle size was 20 nm. Nearly spherical morphology 120 of the so formed powder was confirmed using TEM.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of making a scintillator nanomaterial comprising a plurality of nanoparticles, wherein said plurality of nanoparticles comprises at least one dopant and one of a metal oxide, a metal phosphate, a metal silicate, a metal hafnate, a metal aluminate, and combinations thereof, wherein said metal is one of an alkali earth metal, a lanthanide, and a transition metal, the method comprising the steps of:
    (a) providing at least one metal precursor and at least one dopant precursor;
    (b) forming a homogenized precursor solution of the at least one metal precursor and the at least one dopant precursor;
    (c) adding a fuel and optionally at least one of a phosphate source, a silicate source, a hafnate source, and an aluminate source to the homogenized precursor solution;
    (d) removing water from the homogenized precursor solution to leave a reaction concentrate; and
    (e) igniting the reaction concentrate to form a powder comprising said plurality of nanoparticles.

2. The method according to claim 1, wherein the scintillator nanomaterial is selected from the group consisting of strontium hafnate, yttrium gadolinium oxide, gadolinium aluminate, and combinations thereof.

3. The method according to claim 1, wherein the plurality of nanoparticles has a mean particle size in a range from about 10 nm to about 300 nm.

4. The method according to claim 3, wherein the plurality of nanoparticles has a mean particle size in a range from about 10 nm to about 100 nm.

5. The method according to claim 4, wherein the plurality of nanoparticles has a mean particle size in a range from about 20 nm to about 60 nm.

6. The method according to claim 1, wherein the transition metal is one of vanadium, chromium, manganese, iron, cobalt, nickel, copper, zinc, zirconium, niobium, molybdenum, ruthenium, rhodium, rhenium, osmium, iridium, hafnium, tantalum, and combinations thereof.

7. The method according to claim 1, wherein the lanthanide is one of lanthanum, cerium, praseodymium, neodymium, samarium, europium, gadolinium, terbium, dysprosium, holmium, erbium, thulium, ytterbium, lutetium, yttrium, and combinations thereof.

8. The method according to claim 1, wherein the alkali earth metal is one of calcium, strontium, barium, and combinations thereof.

9. The method according to claim 1, wherein said phosphate source is one of di-ammonium hydrogen phosphate, phosphoric acid, boron phosphate, and combinations thereof.

10. The method according to claim 1, wherein said silicate source is one of tetraethyl orthosilicate, tetramethyl orthosilicate, and combinations thereof.

11. The method according to claim 1, wherein said hafnate source is one of hafnium chloride, hafnium nitrate, hafnium carbonate, hafnium acetate, and combinations thereof.

12. The method according to claim 1, wherein said aluminate source is one of aluminum chloride, aluminum nitrate, aluminum carbonate, aluminum acetate, and combinations thereof.

13. The method according to claim 1, wherein the fuel is a carbon source.

14. The method according to claim 13, wherein the carbon source is selected from the group consisting of urea, glycine, hydrazine, and combinations thereof.

15. The method according to claim 1, wherein the plurality of nanoparticles are optically transparent to visible light.

16. The method according to claim 1, wherein the metal precursor is selected from the group consisting of a metal nitrate, a metal oxide, a metal acetate, a metal carbonate, and combinations thereof.

17. The method according to claim 1, wherein the dopant precursor is a compound selected from the group consisting of cerium, lutetium, europium, terbium, and combinations thereof and is selected from the group consisting of an oxide, an acetate, a carbonate, a nitrate, and combinations thereof.

18. The method according to claim 1, wherein the step of forming a homogenized precursor solution of at least one metal precursor and at least one dopant precursor comprises:
    (a) reacting the at least one metal precursor and the at least one dopant precursor with a nitrate source to form a metal nitrate; and
    (b) dissolving the metal nitrate in water.

19. The method according to claim 18, wherein the nitrate source comprises at least one of nitric acid and ammonium nitrate.

20. The method according to claim 1, wherein the homogenized precursor solution is formed by dissolving the at least one metal precursor and the at least one dopant precursor in water.

21. The method according to claim 1, wherein the homogenized precursor solution has a pH in a range from about 0.5 to about 5.

22. The method according to claim 21, wherein the pH is in a range from about 1 to about 3.5.

23. The method according to claim 1, wherein the fuel and the metal nitrate are present in said homogenized precursor solution, in a ratio in a range from about 1:2 to about 2:1.

24. The method according to claim 1, wherein the water is removed from the homogenized precursor solution using a microwave oven.

25. The method according to claim 1, wherein the water is removed from the homogenized precursor solution using a furnace.

26. The method according to claim 1, wherein the water is removed from the homogenized precursor solution using a hot plate, heated to a temperature in a range from about 200° C. to about 500° C.

27. The method according to claim 26, wherein the temperature is in a range from about 200° C. to about 300° C.

28. The method according to claim 1, further comprising the step of homogenizing the powder.

29. The method according to claim 28, wherein the step of homogenizing the powder comprises at least one of grinding and milling the powder.

30. The method according to claim 1 further comprising the step of stabilizing said powder, wherein the step of stabilizing comprises heating said powder to a temperature in a range from about 600° C. to about 1200° C., in a controlled atmosphere for a period of time.

31. The method according to claim 30, wherein the predetermined temperature is in a range from about 800° C. to about 1000° C.

32. The method according to claim 30, wherein the controlled atmosphere is selected from the group consisting of air, nitrogen, hydrogen, and combinations thereof.

33. The method according to claim 30, wherein the period of time is in a range from about 1 hour to 12 hours.

34. The method according to claim 33, wherein said period of time is in a range from about 1 hour to 6 hours.

* * * * *

UNITED STATES PATENT AND TRADEMARK OFFICE
CERTIFICATE OF CORRECTION

PATENT NO. : 7,449,128 B2 Page 1 of 1
APPLICATION NO. : 10/872867
DATED : November 11, 2008
INVENTOR(S) : Krishna et al.

It is certified that error appears in the above-identified patent and that said Letters Patent is hereby corrected as shown below:

In Column 3, Line 63, after "coefficient" delete "r" and insert -- $\tau$ --, therefor.

Signed and Sealed this

Fourteenth Day of July, 2009

JOHN DOLL
*Acting Director of the United States Patent and Trademark Office*